Feb. 26, 1952 E. J. POITRAS ET AL 2,586,990
CONTROL SYSTEM
Filed April 11, 1935 7 Sheets-Sheet 4
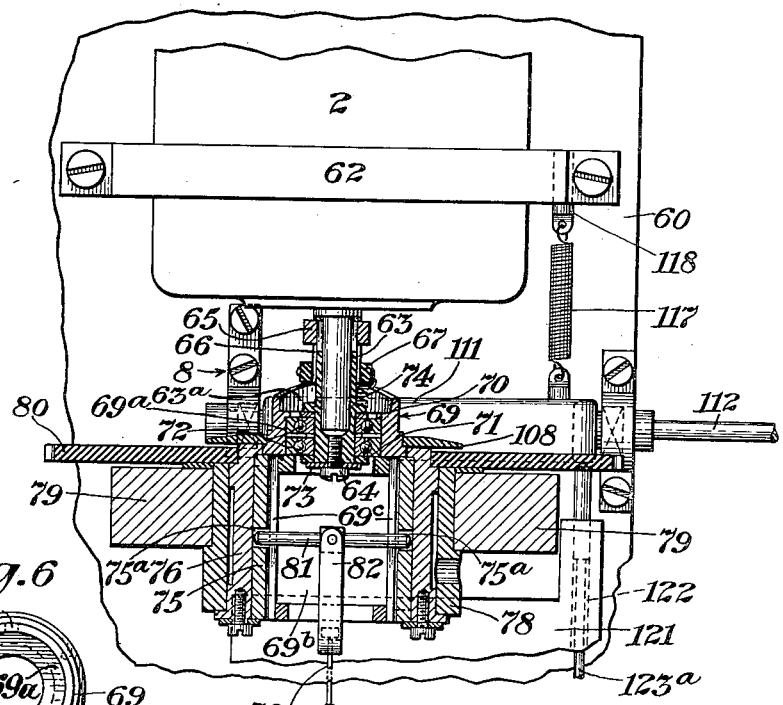
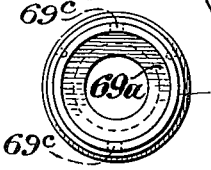
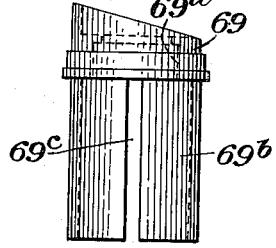
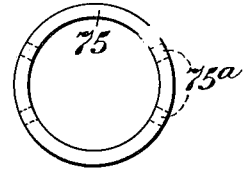
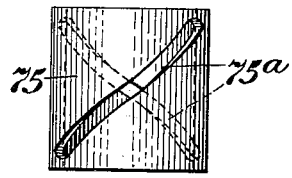
INVENTORS
Edward J. Poitras
James D. Tear
BY
THEIR ATTORNEY

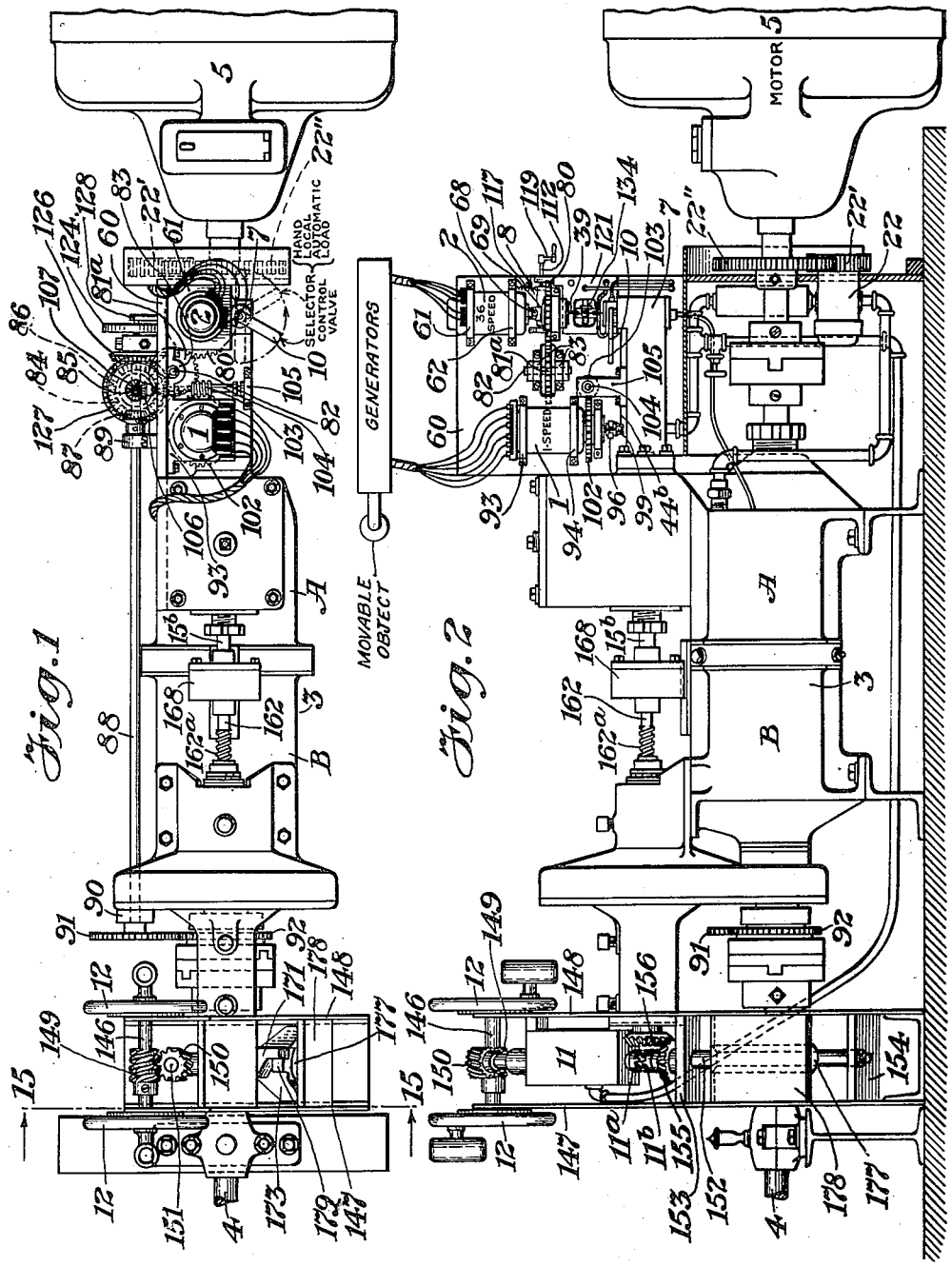

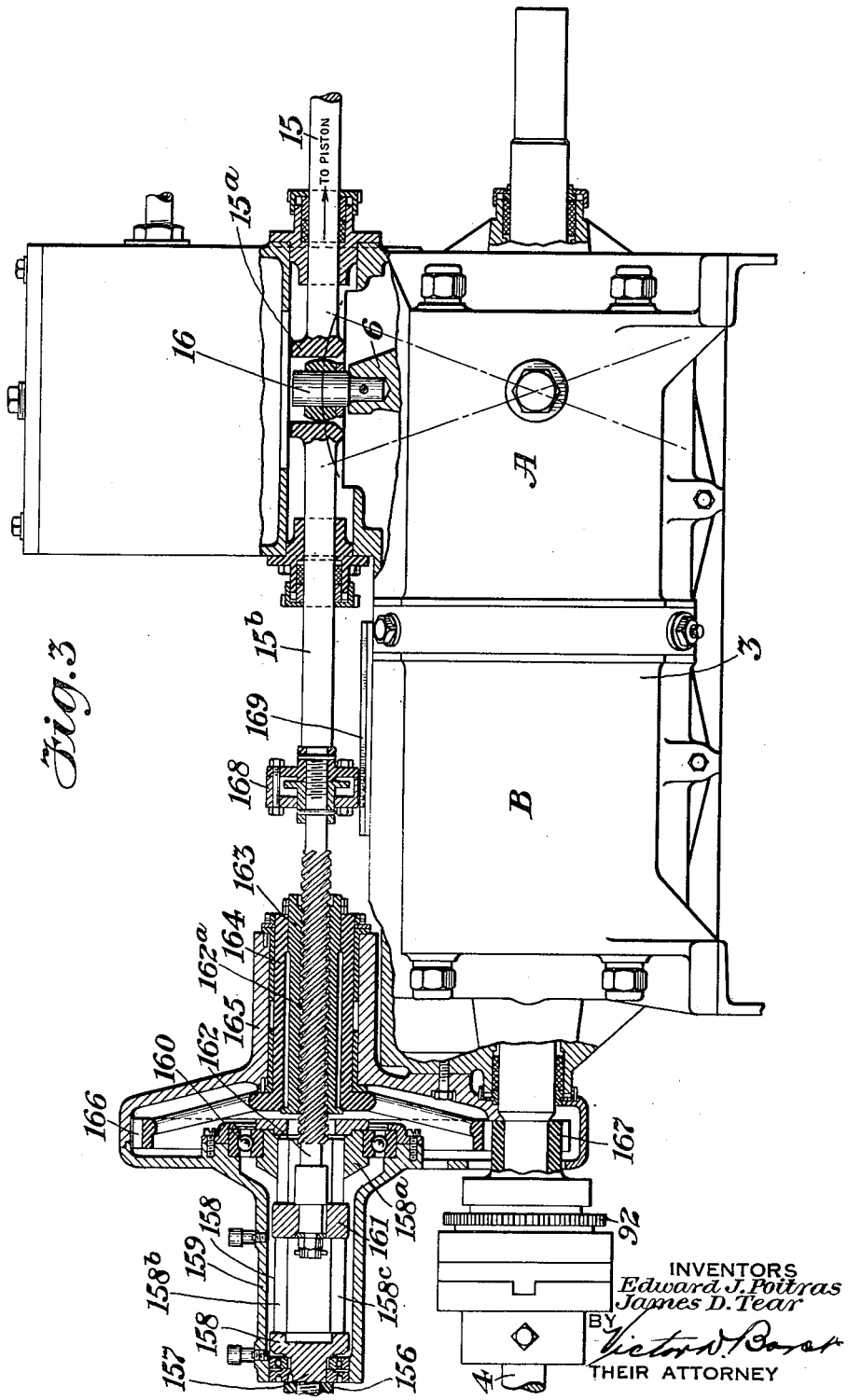

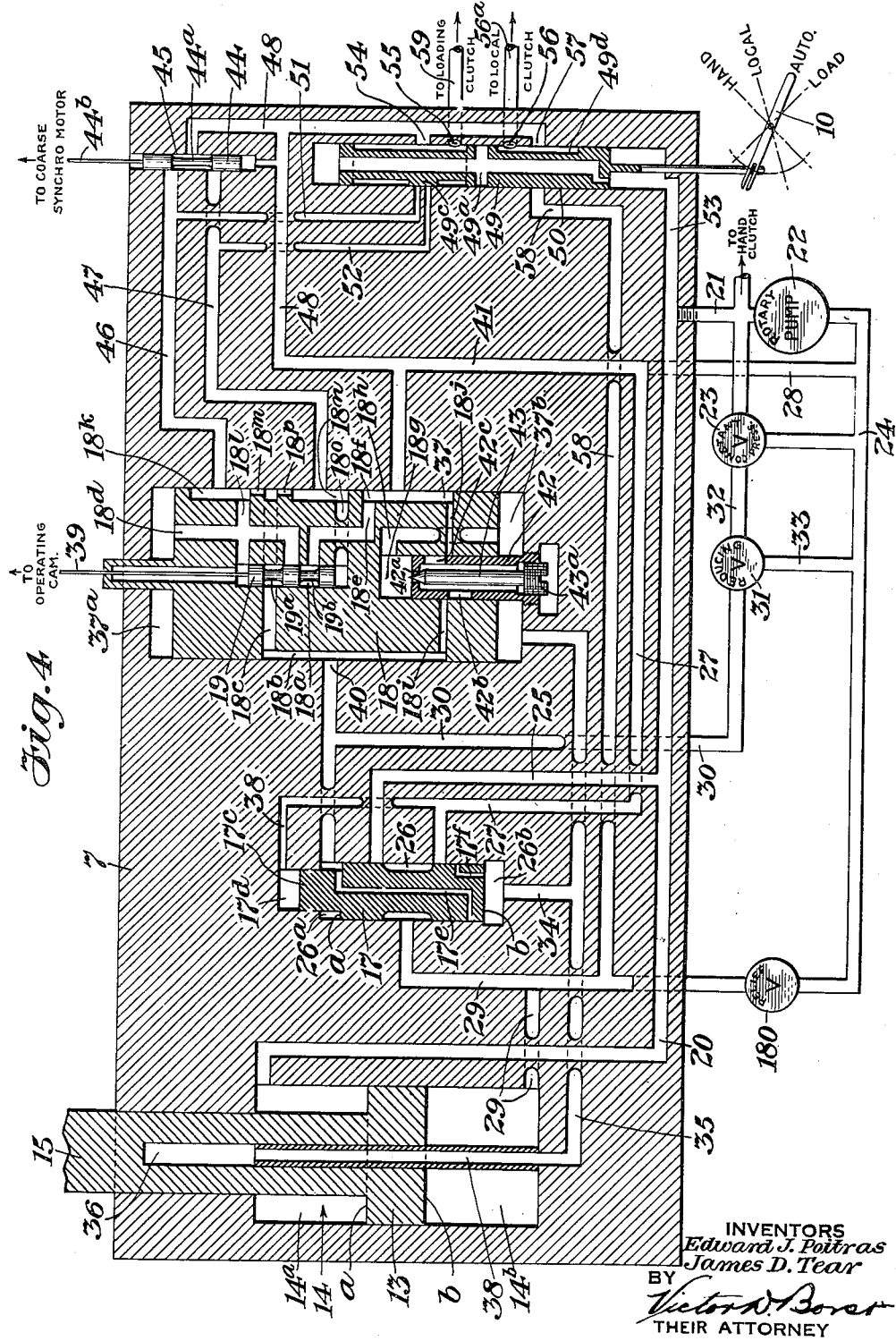

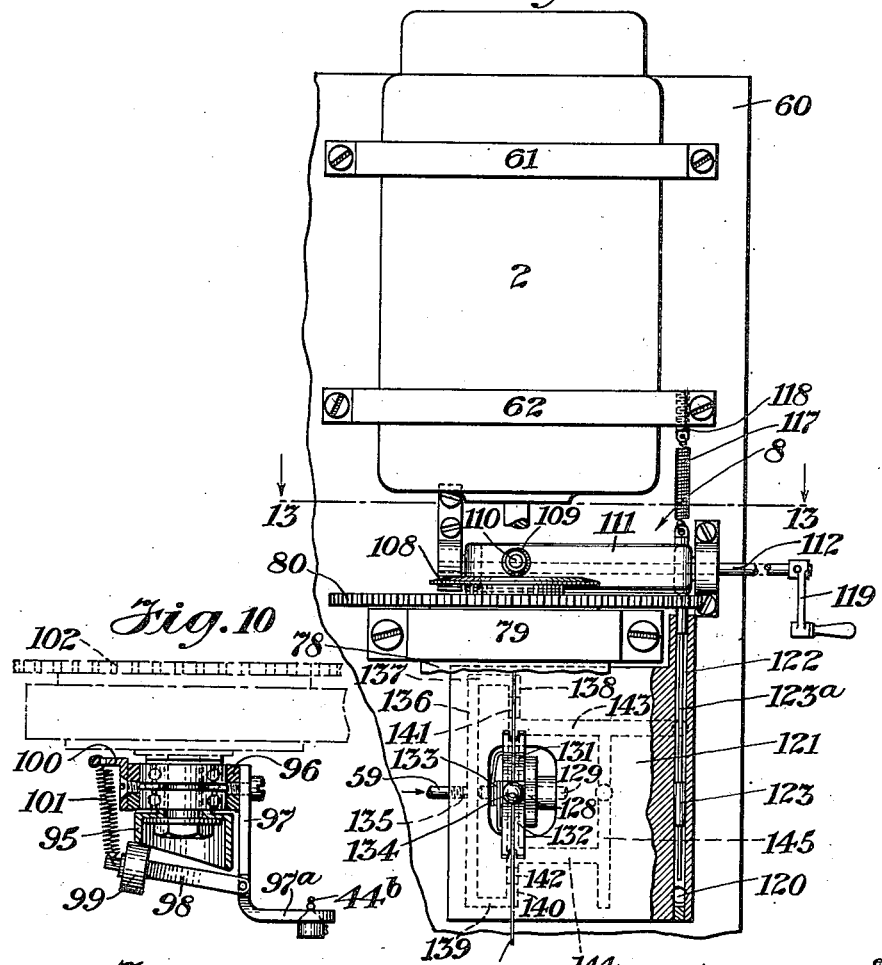

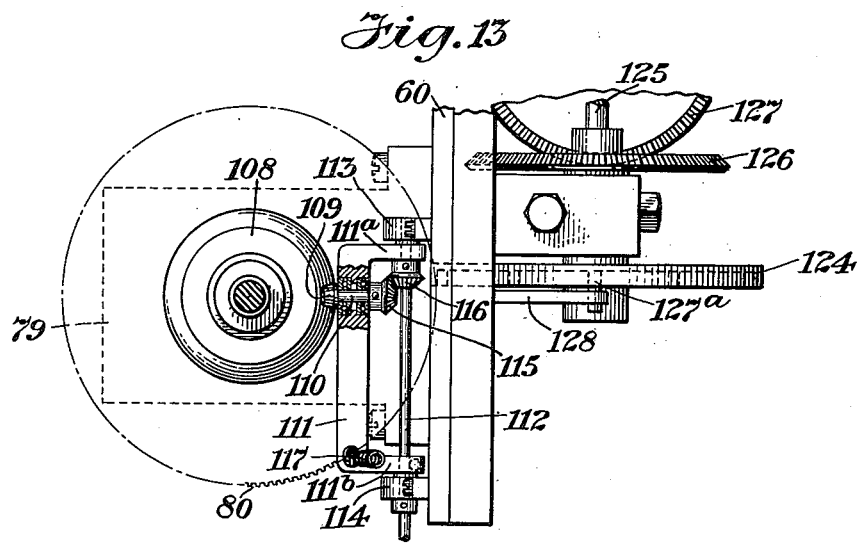
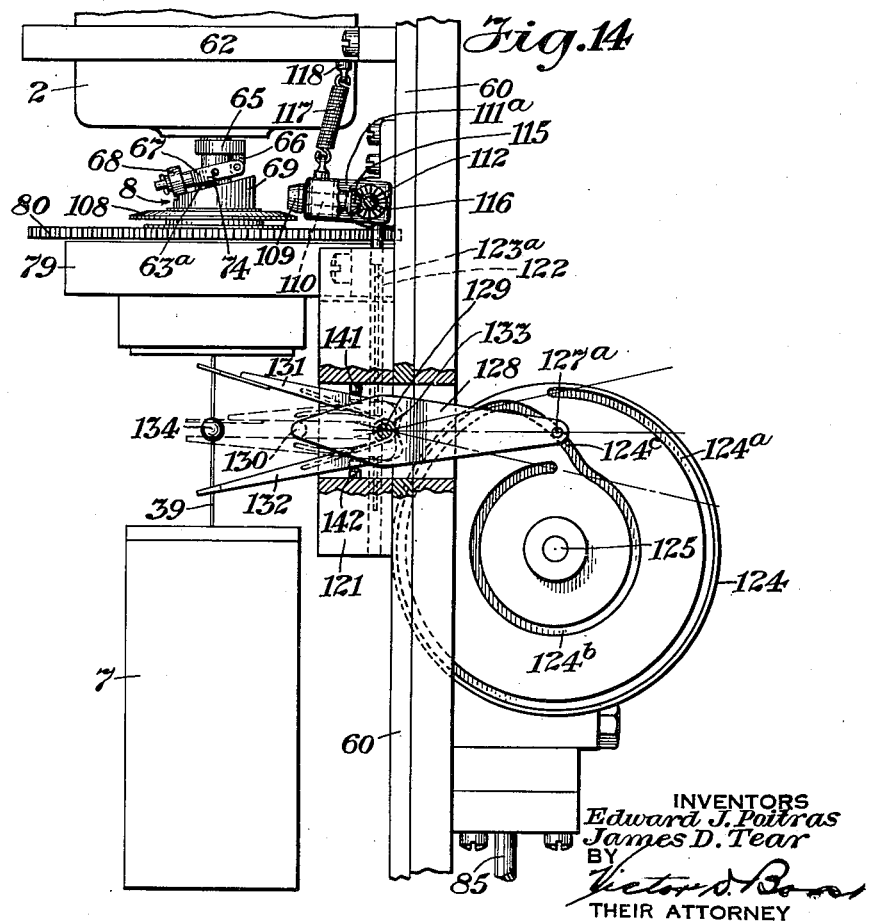
INVENTORS
Edward J. Poitras
James D. Tear
BY
THEIR ATTORNEY

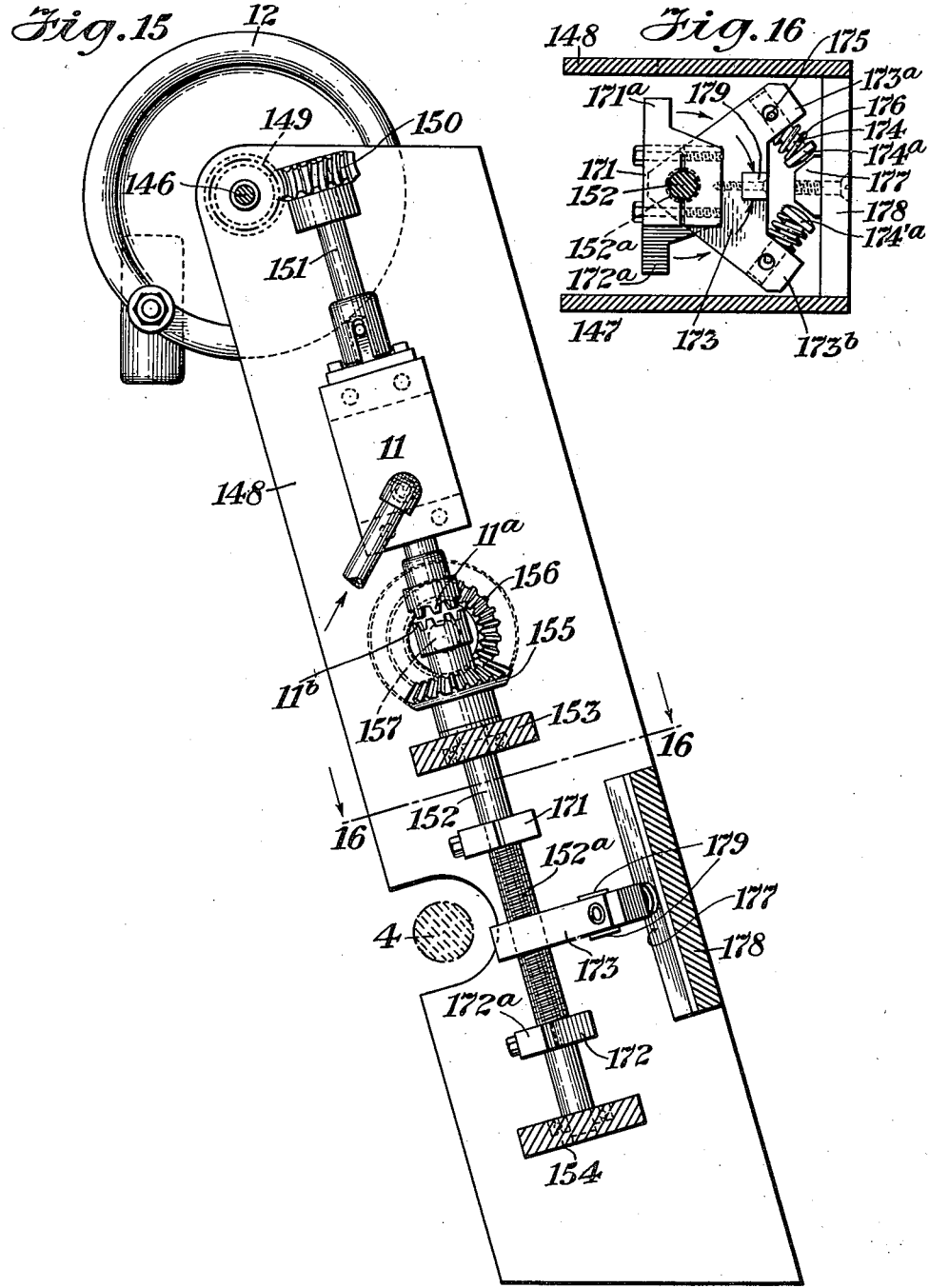

Patented Feb. 26, 1952

2,586,990

UNITED STATES PATENT OFFICE 2,586,990

CONTROL SYSTEM

Edward J. Poitras, Jackson Heights, and James D. Tear, Great Neck, N. Y., assignors to The Sperry Corporation, a corporation of Delaware Application April 11, 1935, Serial No. 15,758

7 Claims. (Cl. 89—41)

The invention herein disclosed relates to automatic follow-up mechanisms for controlling the velocity and movement of a driven object in accordance with the movement of a primary movable object, and a mechanism embodying the invention constitutes an improvement on the system and mechanism illustrated and described in our copending application Serial No. 1,290, filed January 11, 1935.

In our aforementioned application, there is illustrated and described a mechanism for driving an object in accordance with the movement of another object and the system is specifically applied for movement of a gun mount, the system illustrated being such that a large ordnance piece is moved in exact accordance with a signal without the intervention of a human agency. The system includes a variable velocity driving mechanism which has a control element and is used for moving the driven object. The velocity of the driving mechanism may either be varied manually by direct application to the control element of the physical force of an operator, which mode of operation is known as hand control; or the velocity may be varied automatically through a power-operated actuating mechanism which is controlled in accordance with the difference in movement between the driven object and a movable object the movements of which are to be reproduced by the driven object, which mode of operation is known as automatic control. In such systems it has been found to be desirable to provide, in addition to the direct manual or hand control and the automatic control acting in accordance with the difference between the movements of the movable and driven objects, a control mechanism operating automatically through the power-operated actuating mechanism to effect movement of the driven object to a fixed, predetermined position, for example, to bring a gun to the loading position after it has been fired. It has also been found desirable under certain conditions to effect movement of the gun in response to manual operation of the power-controlled actuating mechanism in order that the driven object may be controlled manually with slight physical exertion on the part of the operator. This invention has for one of its objects the introduction of such controls into this mechanism, and for another object the refinement and simplification of such systems.

These and other objects are realized in accordance with this invention by providing operating mechanism, known as "Load Control," for the control of the power-operated actuating mechanism for the control element of the variable velocity driving mechanism that effects the operation of the actuating mechanism to cause the driving mechanism to move the driven object to a fixed, predetermined position; and by providing other operating mechanism, known as "Local Control," for the control of the said power-operated actuating mechanism which operating mechanism is manually operative. These operating mechanisms and the automatic control may be selectively rendered effective for operating the power-operated actuating mechanism, and the power-operated actuating mechanism and hand control may be selectively rendered effective for actuating the control element of the variable velocity driving mechanism.

These improvements are incorporated in a mechanism illustrated in the accompanying drawings which mechanism is particularly suitable for moving large ordnance pieces.

In the drawings:

Fig. 1 is a plan of a complete apparatus embodying the invention;

Fig. 2 is a side elevation of the same modified to show schematically the movable object and its connection to the receivers of the self-synchronous electrical transmission system;

Fig. 3 is a side elevation, partly in section, of the variable velocity hydraulic gear or driving mechanism portion of the apparatus;

Fig. 4 is a diagrammatic illustration of the amplifier and differential for the hydraulic gear or driving mechanism;

Fig. 5 is a longitudinal section of the mechanism for actuating an element of the control for the hydraulic gear or driving mechanism;

Fig. 6 is an end view of a cam;

Fig. 7 is a longitudinal elevation of the same;

Fig. 8 is an end view of another cam;

Fig. 9 is a longitudinal elevation of the same;

Fig. 10 is a longitudinal section of mechanism for actuating another element of the control for the hydraulic gear or driving mechanism;

Fig. 11 is an end elevation of the same and shows a part of the control for the hydraulic gear or driving mechanism;

Fig. 12 is a fragmentary elevation of a receiver and the local and loading control mechanism;

Fig. 12a is a sectional view of a block shown in Fig. 12;

Fig. 13 is a sectional plan of the same taken on the line 13—13 of Fig. 12;

Fig. 14 is a fragmentary elevation, party in section, of the same at ninety degrees with respect to the elevation illustrated in Fig. 12;

Fig. 15 is a sectional elevation of the hand control mechanism taken along the line 15—15 of Fig. 1; and Fig. 16 is a transverse section of the same taken along the line 16—16 of Fig. 15.

GENERAL DESCRIPTION

The movable and driven objects may take many forms, for example if the system be used for driving the rudder of a vessel, the movable object will be the control levers and the driven object the rudder, and if the system be used in ordnance for which the mechanism illustrated is particularly suitable, the mechanical element of the gun fire control mechanism the movement of which is to be followed will constitute the movable object and the gun the driven object. In any event, the movable object is mechanically connected to two generators of a self-synchronous electrical system, one of which operates in a one to one ratio with the movable object and the other of which operates at some higher ratio with respect to the movable object such, for example, as thirty-six to one. These generators are electrically connected to receivers 1 and 2 respectively which constitute a factor in controlling a variable velocity driving mechanism shown as a hydraulic gear 3 through which a shaft 4, connected to the output end of the hydraulic gear and the driven object, is driven. The input end of the hydraulic gear is connected to a constant speed electric motor 5.

The hydraulic gear 3 is of a well known type such as that disclosed in United States Letters Patent No. 925,148 granted June 15, 1909, to H. D. Williams for Variable Speed Gear, with certain modifications which will appear in the detailed description of the several parts of the system. Essentially, the hydraulic gear includes a hydraulic pump known as the "A" end and driven by the electric motor 5, and a hydraulic motor known as the "B" end and connected to the shaft 4. The "A" and "B" ends are identical in construction with one exception. Each consists of a series of cylinders about and parallel to the longitudinal or shaft axis of the gear. The cylinders of the pump and the motor extend in opposite directions and are separated by a stationary valve plate through which they communicate. The forces acting upon reciprocating pistons in the cylinders are resolved into component forces which are so utilized that in the pump rotary movement of the pistons is converted into reciprocating movement, and in the motor reciprocating movement of the pistons is converted into rotary movement. This conversion is effected by plates or boxes inclined to the axis of the gear shaft. The inclination of the motor plate is fixed but the plate 6 (Fig. 3) or tilting box, as it is commonly called, of the pump is mounted so that its angle of inclination with respect to the axis of the shaft may be varied to vary the length of the stroke of the pistons or to change their phase relation. It is by varying the inclination of this tilting box that the velocity, both speed and direction of the motor may be varied.

Movement of the driven object is controlled by moving the tilting box of the hydraulic gear, the direction of movement of the driven object being dependent upon the direction in which the tilting box is moved from its neutral position, i. e. perpendicular to the axis of the shaft, and the speed of the movement of the driven object being dependent upon the extent the tilting box is moved from its neutral position. The tilting box therefore may be called a control member. When the system is in operation, the tilting box is moved from its neutral position in accordance with the difference in movement between the movable object, represented by the receiver motors 1 and 2, and the driven object, represented by the shaft 4. In actual operation the receiver motor 2 acts as a vernier and normally assumes the control of the movement of the tilting box.

The receiver motor 1 takes over control whenever the movable and driven objects are out of phase more than a few degrees, as, for example, when synchronizing or during conditions of rapid acceleration and deceleration, and at all times acts to maintain the synchronous relation of the movable and driven objects.

The receiver motor 1 and its associated control mechanism is connected at a low ratio, for example, one to one, to both the movable object and the driven object, while the receiver motor 2 and its associated control mechanism is connected at a higher ratio, for example, thirty-six to one, to both the movable object and the driven object. The connections from the receiver motors to the movable object are electrical and the connections to the driven object or shaft 4 are mechanical in the embodiment shown. These connections and their operation to effect movement of pilot valves in accordance with the difference in movement between the movable and the driven objects are hereinafter described. These pilot valves control a hydraulic amplifier and differential 7 (Figs. 2 and 4) which effects the operation of a hydraulically operated piston connected to the tilting box of the hydraulic gear.

A yieldable connection designated generally by the reference character 8 in Figure 2, between the differential through which the receiver 2 acts and the pilot valve operated by the output of the differential, permits the operation of the tilting box through the hydraulic amplifier for both load control and local control, a manually operable shaft as later described enables the operator to manipulate the hydraulic amplifier manually for local control with slight physical effort. The several controls are individually rendered effective by the manual operation of a lever 10 (Figs. 1 and 4) which actuates a selector valve in the hydraulic amplifier 7 to bring one or the other of the controls into operation depending upon the position of the valve. The selector valve also controls a hydraulically operated clutch 11 through which the tilting box of the hydraulic gear may be operated by the direct application of the physical force of an operator exerted through hand-wheels 12.

AUTOMATIC OPERATION

Within the hydraulic amplifier designated generally by the numeral 7 and shown diagrammatically in Figure 4, there is a piston 13, reciprocally mounted in a cylindrical compartment 14. The piston 13 is connected to the tilting box of the hydraulic gear by a piston rod 15 which extends into the hydraulic gear and is enlarged at 15a at which point it is provided with an opening to receive a stud 16 extending from the tilting box, the connection being as shown in the nature of a universal joint. The piston is thus directly connected to the tilting box and the tilting box is moved from its neutral position, perpendicular to the axis of the hydraulic gear, in accordance with the movements of the piston. Fluid under pressure is admitted to and exhausted from the cylindrical compartment 14 containing the piston to control movement of the piston by a piston valve 17. This valve is in turn actuated in accordance with the difference in the movements of a plunger 18, the action of which is controlled by a pilot valve 19, and of the piston 13. The operation is accomplished by the interconnection of the several parts as illustrated diagrammatically in Figure 4 of the drawings.

The piston 13 is of the differential type in which one face $a$, that having the piston rod connected thereto, the upper face as seen in Figure 4, is one-half of the area of the opposite or lower face $b$. With this arrangement, the same pressure acting upon the face $b$ creates a force twice as great as the force created by the same pressure acting upon the face $a$ of the piston 13. The chamber 14$a$ of which the face $a$ of the piston 13 forms an end wall is directly connected through a passage 20 and a pipe 21 to a pump 22. The pump is of the rotary type capable of furnishing a fluid under a pressure of 600 or more pounds per square inch, and it is directly connected to the shaft of the motor 5 through gears 22' and 22'' (see Fig. 2). The pressure delivered by the pump to the passage 20 is maintained at a constant pressure, preferably 600 pounds per square inch, by a constant pressure valve 23 which is connected to the high pressure pipe 21 and a pipe 24 connected to the intake side of the pump. Fluid under a constant pressure of 600 pounds per square inch is, therefore, maintained in the chamber 14$a$ of the cylinder 14. A branch passage 25 connects the high pressure passage 20 to a port communicating with the valve compartment 26 in which the valve 17 is mounted. Another port communicating with the valve compartment 26 is connected by a passage 27 and a pipe 28 to the intake side of the pump, the passage 27 constituting an exhaust passage. The chamber 14$b$ formed in the cylindrical compartment 14 and having the piston face $b$ as one wall thereof is connected by a supply passage 29 to a port communicating with the valve chamber 26 and midway between the pressure and exhaust ports. The piston valve 17 is of the usual type having a reduced section at its axial center and when in the off position, it laps the pressure and exhaust ports. If, however, the valve is moved upwardly from the position shown in Figure 4, the pressure port is connected to the passage 29 and fluid at a pressure of 600 pounds per square inch is admitted to the chamber 14$b$. Since this creates a force on the surface $b$ of the piston twice as great as the force acting on the surface $a$ of the piston, the piston will be moved upwardly from the position shown in Figure 4. Likewise, when the valve is moved downwardly from the position shown, the exhaust passage 27 is connected to the passage 29 and the pressure in the chamber 14$b$ is reduced so that the force acting upon the face $a$ of the piston causes the piston to move in the opposite direction. With this arrangement movement of the piston is controlled by the single piston valve 17.

The piston valve 17 is hydraulically operated and it is, like the piston 13, of the differential type. The piston valve 17 has a face $a$ of one-half the area of the face $b$. The portion 26$a$ of the valve chamber of which the face $a$ of the piston valve 17 forms one wall, is connected by a passage 30 to a reducing valve 31. The reducing valve 31 is in turn connected to the high pressure by a pipe 32 and to the exhaust by a pipe 33. This reducing valve is of the usual type and supplies fluid under pressure at approximately 100 pounds per square inch. The opposite end of the valve compartment 26, that is, the section 26$b$ of which the face $b$ of the piston valve forms a wall, is connected by a branch passage 34 to a passage 35. The passage 35 connects a variable volume chamber 36 formed in the piston 13 and the piston rod 15 with the lower end 37$b$ of the plunger compartment 37 in which the plunger 18 is mounted.

The variable volume chamber in the piston 13 and the piston rod 15 is formed by boring a hole axially of the piston and piston rod. Into this hole there is inserted a tube 38 which is slidably mounted therein and which forms a snug fit with the walls thereof. The tube is connected at one one to the head of the cylindrical chamber 14. As the piston moves, the chamber 36 is enlarged or contracted. This chamber 36, the chamber 26$b$ of the valve chamber 26, and the chamber 37$b$ of the valve compartment 37 contains fluid under a pressure of one-half the pressure in the passage 30, that is, 50 pounds per square inch. The volume formed by this chamber and these compartments constitutes what is termed a reference volume.

The extended section 17$c$ of the piston valve 17 which is provided to form a surface $a$ of one-half the area of the surface $b$ extends into a chamber 17$d$ which is connected by a passage 38 to the exhaust passage 27. Thus, when the pressure in the chamber 26$a$ is 100 pounds per square inch and the pressure in the chamber 26$b$ is 50 pounds per square inch, the piston valve 17 is balanced and there is no movement. The reference volume, that is, the chambers and passages determining the reference volume constitute a closed system. The balanced condition of the valve may, therefore, be disturbed and the valve actuated by varying the volume of a chamber forming a part of the reference volume. The reference volume may be and is, in the operation of the system, affected by movement of the plunger 18 and the piston 13.

Movement of the plunger 18 is controlled by the pilot valve 19, as heretofore stated. The pilot valve 19 is mounted within the plunger itself in a valve compartment 18$a$. To one end of this valve there is connected a valve rod 39 which extends through the end of the plunger. The plunger has a longitudinal groove 18$b$ formed in its surface and connected by a passage 40 to the low pressure passage 30. A bore 18$c$ transverse of the plunger connects the groove 18$b$ with the valve compartment 18$a$. The valve 19 has two reduced sections 19$a$ and 19$b$. The passage 18$c$ connects with the valve compartment at the reduced portion 19$a$ of the valve 19, when the valve is in its neutral position or midway between the ends of the valve compartment, which is the position shown. A passage 18$d$ through the plunger connects the chamber 37$a$ of the plunger compartment with the valve compartment. The port through which the passage 18$d$ is connected to the valve compartment 18$a$ is spaced from the port through which the passage 18$c$ connects with the valve compartment 18$a$. Another passage 18$e$ connects the valve compartment 18$a$ with a groove 18$f$ in the surface of the plunger which in turn is connected by a passage 41 to the exhaust passage 27.

With this arrangement, it will be observed that if the valve 19 is moved downwardly from the position shown in Figure 4, fluid under pressure will pass through the passage 30, the passage 40, groove 18$b$, passage 18$c$, passage 18$d$ to chamber 37$a$. The fluid under pressure in the chamber 37$a$ acting upon the face of the plunger will cause the plunger to move down and contract the chamber 37$b$, thus, altering the distribution of the volumetric space of the closed system. This movement of the plunger will react upon the face $b$ of the valve 17 and cause the valve to move to a position in which the passage 25 is placed into communication with the passage 29. Oil under high pressure then enters the chamber 14$b$ and acts upon the face $b$ of the piston 13 causing the piston to move upwardly from the position of Figure 4. This movement of the piston moves the tilting box to which it is directly connected. As a consequence of the movement of the piston, however, the variable volume chamber 36 is enlarged, thus tending to reduce the pressure in the closed system. The volume of the chamber 36 will increase until the valve 17 under the force of the pressure on the face $a$, moves back to a position in which the high pressure and exhaust ports are lapped. If on the other hand, the valve rod 39 is moved upwardly, the passages 18e and 18d will be placed in communication as the reduced section 19b of the valve 19 will bridge these two passages. The plunger chamber 37a will then be placed into communication with the exhaust passage 41, and the pressure passage 18c will be cut off from communication with the passage 18d. Due to the pressure acting upon the face $a$ of the piston valve 17 and the connection of the plunger chamber 37a to the exhaust, the piston valve will move downwardly and the passage 29 and the exhaust passage 27 will be bridged by the reduced portion of the valve 17 and placed into communication. The fluid pressure in the chamber 14b will then be reduced and the piston 13 will move downwardly under the force of the fluid acting upon the face $a$ of the piston. This action will cause the chamber 36 to be contracted and will thus increase the pressure in the valve chamber 26b until the valve 17 cuts off the passages 25 and 27.

It is to be noted that the plunger 18 follows the valve 19; in fact, in actual operation the difference in movement between these elements is imperceptible. The effect, however, is that while movement of the valve opens the chamber 37a either to fluid under pressure or to the exhaust, the plunger follows the valve and the neutral relation of the plunger and valve is restored in the new position of the valve. Movement of the valve to a position from that shown in the drawings to another position, therefore, causes a definite movement of the punger 18 and as above explained a definite movement of the plunger causes the piston 13, and consequently the tilting box, to be moved from the neutral position a definite amount proportional to the movement of the plunger 18 and, therefore, of the valve 19. When the valve 19 is moved from the position shown in Figure 4 and held in the new position a period of time, the "B" end of the hydraulic gear operates at a constant velocity over that period of time, the direction of movement being dependent upon the direction in which the valve 19 is moved. When the valve 19 is restored to the position shown in Figure 4, the piston 13 assumes a position at the longitudinal center of the piston compartment 14, in which position of the piston the tilting box of the hydraulic gear is in its neutral position.

Advancing valve

As heretofore stated, the pilot valve 19 is actuated in accordance with the difference in movement between the movable and driven objects, through means hereinafter specifically described, and, therefore, the driven object must lag behind the movable object before movement of the valve is effected. However, when the driven object is in movement, it is desirable to bring it into positional agreement with the movable object or signal and for this purpose there is provided a valve controlled by the plunger 18 for admitting fluid to and exhausting it from the reference volume. The valve consists of a cylindrical element 42 secured at one end in the head of the plunger compartment 37 and extending into a recess 18g in the plunger in which it is slidably mounted. The cylindrical element 42 has the end thereof which is received in the recess in the plunger closed except for a small opening 42a, therethrough, the edges of which form a valve seat for a needle valve 43. The needle valve has an enlarged threaded end section 43a which is threaded in an enlarged recess in the open end of the cylinder 42. The needle valve can thus be adjusted with respect to its seat. Through the side wall of the cylindrical element 42, there are two openings 42b and 42c spaced from each other longitudinally of the cylinder. The inner end of the recess 18g in the plunger is connected by a passage 18h to the chamber 37b. A passage 18i connects the groove 18b in the surface of the plunger to the recess 18g at a point adjacent and above the opening 42b in the wall of the cylinder 42 as seen in Figure 4, and a passage 18j connects the recess 18g, at a point adjacent and below the opening 42c, to a longitudinal groove 18f in the surface of the plunger. Thus, as the plunger moves down and increases the pressure of the reference volume, the passage 18i communicates with the opening 42b and the interior of the cylinder 42. Fluid under pressure, therefore, flows through the passage 40, groove 18b, passage 18i, cylinder 42, needle valve opening 42a and passage 18h to increase the pressure in chamber 37b and augment the effect of the downward movement of the plunger. If on the other hand the plunger moves upwardly, then the passage 18j is placed in communication with the interior of the cylinder 42 by registering with the opening 42c. The flow of fluid is then reversed; it passes from the chamber 37b through the passage 18h, needle valve opening 42a, opening 42c, passage 18j, groove 18f and to exhaust passage 41. Thus, the reference volume is decreased and the effect of the movement of the plunger augmented. The adjustment of the needle valve 43 is empirical and depends upon the conditions of service.

The piston valve 17 contains limiting ports and passages 17e and 17f to relieve the valve in the event of extreme movement. The passage 17e, in the event the valve is moved downwardly to an extreme position connects the chamber 26b to the pressure passage 30 and thus admits pressure to the chamber 26b to raise the valve. If the valve is moved upwardly to an extreme position, the passage 17f connects the chamber 26b to exhaust passage 27 and thus relieves the pressure in chamber 26b. These limiting ports and passages thus act as limit stops, and in addition they serve to maintain the proper volume, and regulate the pressure of the oil in the reference volume.

Synchronous valve

Due to the high ratio, thirty-six to one, of the mechanism operating the valve 19 with respect to the movable and driven objects, the movable and driven objects might get out of synchronism and in order to maintain the synchronous relation there is provided a valve 44 which, when the movable and driven objects are a few degrees out of phase, takes over control of the pilot valve 19, this being permitted by the flexible connection between the valve rod 39 and the driving mechanism therefor, previously mentioned and hereinafter described in detail. The valve 44 is an ordinary piston valve having a reduced central portion 44a. Through a valve rod 44b, the valve is connected for operation in accordance with the difference in movement of the movable object, the receiver 2, and the driven object in a one to one ratio. The valve compartment 45 in which the valve is mounted is connected by two passages 46 and 47 spaced longitudinally of the valve to the plunger compartment 37. The passage 46 communicates with a groove 18k in the surface of the plunger extending longitudinally of the plunger and communicating with a passage 18l and through a restricted passage 18m with the passage 18c. The passage 47 communicates with a groove 18n in the surface of the plunger extending longitudinally of the plunger and communicating with a passage 18o and through a restricted passage 18p with the passage 18c. The passage 18l also communicates with the chamber formed between the upper end of the valve 19 and the upper end of the valve compartment 18a, and the passage 18o communicates with the chamber formed between the lower ends of the valve 19 and the valve compartment.

When the valve 44 is in the neutral position as shown in Figure 4, the reduced portion of the valve bridges the passages 46 and 47 and places these passages in communication with an exhaust passage 48 connecting the valve compartment 45 with the exhaust passage 41. There is, therefore, no effect upon the valve 19. If, however, the valve 44 is moved so that the passage 47 is closed, fluid flowing from the passage 18c through the restricted passage 18p, groove 18n, and passage 18o will build up pressure in the lower chamber of the valve compartment 18a. The upper chamber of the valve compartment will be connected to the exhaust through the passages 18l, 18k, 46, valve 44 and passage 48. The pressure in the lower chamber will, therefore, move the valve 19 upwardly from the position shown in Figure 4. On the other hand, if the valve 44 is moved so that the passage 46 is closed pressure will be created in the upper chamber of the valve compartment 18a and the lower chamber will continue to be connected to the exhaust. In this way the valve 19 is moved rapidly and fully, speeding up the movement of the driven member.

*Selector valve*

When the valve 19 is to be operated manually, or operated to bring the driven object to a fixed predetermined position, which may be done as hereinafter described, the valve 44 must be rendered inoperative. This is accomplished through a selector valve 49, that is actuated by the lever 10. The valve 49 is slidably mounted in a valve compartment 50. Passages 51 and 52 connect respectively passages 46 and 47 to the valve compartment 50. When the selector valve is in the position shown, the passages 51 and 52 are blocked off by the valve. In any one of the other three possible positions of the valve, however, these passages are connected to the exhaust and, therefore, it is impossible to build up pressure in the passages 46 and 47 or the chambers of the valve compartment 18a. Thus, the valve 44 cannot have any effect upon the valve 19 when the selector is in any position other than that for automatic operation as illustrated. The selector valve is hollow and the lower end of the valve compartment communicates with the high pressure passage 20, through a passage 53. There is also a transverse passage 49a through the valve at the longitudinal center thereof. On one side of this passage, the upper as seen in Figure 4, the valve is reduced in diameter for a considerable portion of its length, sufficient to bridge three longitudinally spaced passages 54, 55 and 56 which communicate respectively with exhaust passage 48, the hydraulically operated mechanism for bringing into operation the mechanism for moving the driven object into a fixed predetermined position, and through the pipe 56a the mechanism for bringing the manual control of valve 19 into operation. In this reduced area, there is a block 49c which laps the passages 51 and 52 in the automatic position of the valve. Below the passage 49a there is a groove 49d which normally bridges passage 56 and a passage 57 which communicates with the exhaust passage 54.

The selector valve has four possible positions as indicated, called Load, Automatic, Local and Hand. In the automatic position, passages 51, 52 and a passage 58 communicating with the valve compartment and passage 29 are blocked off. The passage 49a and the longitudinal passage through the valve are also cut off and the passages 54 and 55 are in communication, as are also the passages 56 and 57. In the loading position, which brings into operation the mechanism for moving the driven object to a fixed predetermined position, the passages 51 and 52 are placed in communication with the exhaust passage 54; the passage 49a, communicating with the high pressure passage 53 through the longitudinal passage through the valve, is placed in communication with the passage 55 which, through a pipe 59, supplies oil under pressure to a loading clutch which renders the loading mechanism operative; and the passages 56 and 57 are continued in communication. When the valve is moved to the local position, that is, the position for the hand operation of the valve rod 39, the passage 49a is placed in communication with the passage 56, and the passages 51, 52 and 55 are in communication with the exhaust passage 54. In the hand position of the valve, in which position, the hydraulic operation of the tilting box is rendered inoperative and the tilting box may be operated by the direct application of the physical force of an operator to the tilting box, the passage 49a connects the passages 58 and 57. Thus, the passages 58 and 53 are placed in communication with the exhaust so that the intake and exhaust sides of the pump are directly connected and there is no pressure created. The hydraulic actuating means for the tilting box, therefore, becomes inoperative.

*Pilot valve control*

The synchronous receiver 2 is mounted on a plate 60 by means of straps 61 and 62. The mechanism which actuates the valve rod 39 is connected to the shaft of the synchronous receiver 2 through a cylindrical fitting 63 (Fig. 5) pressed on to the shaft. The opening through the end of the fitting 63 is substantially reduced in diameter and receives a machine screw 64. To the inner end portion of the fitting 63, there is secured a bracket 65 having a depending arm 66 to which one end of a bifurcated lever 67 is pivotally secured. On the free end of the bifurcated lever 67, there is rotatably mounted a cam follower 68. The bracket 65 is secured on to the fitting 63 so that it will rotate therewith. The cam follower 68 cooperates with a cam surface formed on the edge of a cylindrical cam 69. The cam with which the follower 68 cooperates is a constant rise cam, that is, it has a constant rise from a low point to a high point diametrically opposite the low point. As shown in Figures 5 to 7, inclusive, the cam 69 has an internal flange 69a of considerable width which is rotatably mounted upon the fitting 63 by ball bearings 72 held on the fitting 63 between collars 70 and 71. The collar 70 abuts against a circumferential flange 63a formed on the fitting 63 and the collar 71 is held in place by a washer 73 secured to the end of the fitting 63 by the machine screw 64. The cam also has a skirt 69b which extends axially from the flange 69a in a direction opposite to the cam surface. The skirt 69b has a pair of diametrically opposite longitudinal slots 69c. The cam follower 68 is held against the cam surface by a spring 74 which is connected at one end to the lever 67 and at the other end to the flange 63a. This arrangement provides a relief coupling between the receiver and the cam 69. When the reaction on the cam 69 does not exceed a certain definite value, the cam follower will remain at the low point of the cam and the cam will rotate with the cam follower. If, however, the torque exceeds the value for which the cam is designed, the cam follower will rise along the surface of the cam. When the torque lessens, the cam and cam follower will resume their normal relation.

The skirt 69b of the cam 69 is surrounded by a positive cam 75. (See Figures 5, 8 and 9.) The cam 75 is a cylindrical member having diametrically opposite helical grooves or slots 75a of a substantial pitch. This cam is received in a bushing 76 to which it is secured against relative rotational movement. The bushing 76 is journaled in a bearing 78 which is supported by a bracket 79 secured to the plate 60. At one end, the upper end as seen in Figure 5, of the bushing 76 there is secured to the bushing a gear 80. Within the skirt of the cam 69 and extending transversely thereof through the slots therein and into the cam grooves 75a of the cam 75, there is a pin 81. To the pin 81 there is pivotally secured one end of a bifurcated link 82 and to the other end of this link the valve rod 39 is secured.

It will be observed that any relative movement between the skirt 69b of the cam cylinder 69 and the cam cylinder 75 will effect a movement of the pin 81 longitudinally of the cams and consequently a movement of the valve rod. In the "neutral" position or the "off" position of the pilot valve 19, the pin 81 extends into the grooves 75a in the cam 75 at the point where these grooves cross each other when projected on to a plane such as illustrated in Figure 9, that is, midway of the grooves. Consequently, relative movement between the cylindrical cam 69 and the cam 75 in one direction will effect longitudinal movement of the valve rod in a particular direction from this neutral position and relative movement of the cams in the opposite direction will effect movement of the valve rod in the other direction.

As previous explained, the cam 69 is normally rotated with the shaft of the receiver 2. The bushing 76 through the gear 80 is rotated in the same direction as the rotation of the cam 69 in accordance with the movements of the driven object. For this purpose, the gear 80 is connected to the shaft of the B end of the hydraulic gear. This connection includes the gear 80, a gear 81a meshing with the gear 80, as shown in Figures 1 and 2, and mounted on a shaft 82 journaled in bearing brackets 83 secured to the plate 60, a gear 84 mounted on a shaft 85 for rotation therewith and meshing with the gear 81a. On the shaft 85, shown in Figure 1, there is mounted a bevel gear 86 which meshes with a bevel gear 87 secured on the end of a shaft 88 that extends longitudinally of the hydraulic gear and is mounted in bearing brackets 89 and 90 secured to the side of the hydraulic gear. On the opposite end of the shaft 88 there is mounted a spur gear 91 which meshes with a gear 92 mounted on the shaft of the B end of the hydraulic gear. The ratio of the gear train just described is such that the gear 80, and consequently the cam 75, is rotated at a speed of thirty-six revolutions for each revolution of the object driven by the shaft 4. As heretofore stated, the receiver 2 operates in a ratio of thirty-six to one with respect to the signal or movable object. The movement of the valve rod 39, therefore, represents the difference in movement between the movable and driven objects in a ratio of thirty-six to one.

The synchronous valve 44 is operated through the receiver 1 which constitutes an electrical differential (see Figures 10 and 11). The stator of the receiver 1 is rotatably mounted in brackets 93 and 94 secured to the plate 60, as shown in Figure 2. On the end of the shaft of the receiver 1, there is mounted a constant rise cylindrical cam 95, best shown in Figure 10, the cam surface of which is the same as that of the cam 69. Rotatably mounted on the shaft of the receiver 1 there is a bushing 96 to which a bracket arm 97 is secured. To the bracket arm 97 there is pivotally secured one end of a bifurcated lever 98 and on the free end of the lever there is rotatably mounted a cam follower 99 which engages the cam surface of the cam 95. The bracket 97 has an arm 97a extending at right angles thereto. To the arm 97a there is secured the end of the valve rod 44b. An L-shaped bracket 100 is also secured to the bushing 96 at a point diametrically opposite to the bracket 97. A spring 101 is connected at one end to the bracket 100 and at the other end to the free end of the lever 98, the spring acting to maintain the cam follower against the surface of the cam 95. The stator of the receiver 1 has secured thereto a gear 102 (see Figures 1 and 2) which meshes with a worm 103 mounted upon a shaft 104 journaled in the plate 60 and a bracket 105 secured to the hydraulic amplifier 7. The shaft 104 extends through the plate 60 and on the end thereof there is secured a beveled gear 106 which meshes with a beveled gear 107 secured on the shaft 85, as shown in Figure 1. Since the shaft 85 is, as heretofore stated, driven from the shaft of the B end of the hydraulic gear, the stator of the receiver 1 is also driven in accordance with the shaft of the B end of the hydraulic gear. The ratio of gearing is such that the stator of the receiver 1 is rotated at the same speed as the driven object. Since the stator is rotated relatively in a direction opposite to that of the movable object, movement of the shaft of the receiver 1 represents the difference in movement between the movable and driven objects in a one to one ratio. The movement of the shaft of the receiver is transmitted through the cam 95 and cam follower 99 to the valve rod 44b, the cam follower and the bracket 97 to which it is secured being moved in accordance with the movement of the cam within the torque limitations of this relief connection. The arrangement is such that the synchronous valve operates to take the control of the pilot valve away from the receiver 2 through the operation of the receiver 1 only when the difference between the movements of the movable and driven objects exceed a certain predetermined amount.

LOCAL CONTROL

As heretofore stated, the valve rod 39 may be actuated manually to effect the operation of the hydraulic gear. This manual operation is effected through a disk 108 secured to the cam 69 and having a beveled edge portion, as shown in Figures 5 and 12. The disk 108 is adapted to be driven by a beveled driving wheel 109 secured on a stub shaft 110 and adapted to engage with the beveled edge portion of the disk. The stub shaft 110 extends through and is journaled in the web section of a U-shaped bracket 111, the arms 111a and 111b of which are pivotally mounted upon a shaft 112 as illustrated in Figures 13 and 14. The shaft 112 is journaled in bearing brackets 113 and 114 secured to the plate 60. On the end of the shaft 110, opposite to that end on which the friction wheel 109 is mounted, there is mounted a bevel gear 115, secured to the shaft for rotation therewith. The bevel gear 115 meshes with a bevel gear 116 mounted on the shaft 112 for rotation therewith. The U-shaped bracket 111 is normally maintained in an elevated position, such that the friction wheel 109 does not engage the disk 108, by a spring 117 secured at one end to the web of the U-shaped bracket and at the other end to a stud 118 secured in the bracket 62, as shown in Figure 14. The shaft 112 may be rotated manually by a crank arm 119 which is secured to the shaft, as revealed in Figure 12. The crank arm 119 may be located at any convenient place.

The friction wheel 109 is brought into engagement with the disk 108 by shifting the lever 10 to the local control position. As heretofore stated, when the lever 10 is moved to the local control position, the valve 49 is so positioned that the transverse passage 49a therethrough is placed in communication with the passage 56, and it is thus connected to the high pressure passage 53. The passage 56 is connected to a passage 120 in a block 121 (see Fig. 12) secured to the plate 60. Within the block 121, there is a plunger compartment 122 in which there is mounted a plunger 123 having a reduced central portion 123a. The passage 120 connects with the plunger compartment behind the plunger. When the passage 56 is thus connected with the transverse passage 49a, fluid under pressure enters the plunger passage in the block 121 and acts upon the plunger. The plunger is thus forced upwardly from the position shown in Figures 12 and 14 and causes the U-shaped bracket 111 to move about the shaft 112 as an axis. The action is such that the friction wheel 109 is pressed against the disk 108 so that there is a frictional engagement between the wheel and the disk.

It is to be noted that the passages 51 and 52, as heretofore stated, are connected to the exhaust when the valve 49 is in the local control position so that the valve 44 cannot effect the operation of the valve 19. It will thus be seen that the local control, or manual control through the hydraulic amplifier acts through the cam 69. Rotation of the shaft 112 through the crank arm 119 effects rotation of the disk and consequently of the cam 69 to which the disk is secured against relative rotational movement. The driven object will therefore follow acurately the movements of the crank arm 119 since the motion transmitting train between the gear 80 and the B end of the hydraulic gear will cause the valve rod to be moved in accordance with the difference in movement between the crank arm 119 and the movement of the hydraulic gear or the driven object. When the local control is in operation, the cam follower 68 rides up the cam 69 and the receiver 2 has no effect upon the actuation of the valve rod 39.

LOAD CONTROL

The mechanism for moving the driven object to a fixed predetermined position also acts through the valve 19. This mechanism includes a positive cam 124 (Figs. 13 and 14) which consists of a circular disk having a cam groove in one surface thereof. The cam groove consists of two concentric circles 124a and 124b connected by a section 124c. The cam is mounted upon a shaft 125 journaled in bearings secured to the plate 60. Also mounted upon the shaft 125 is a beveled gear 126 (see Fig. 1) which meshes with a beveled gear 127 mounted upon the shaft 85. Since the shaft 85 is connected to the B end of the hydraulic gear, the cam 124 will be rotated in accordance with the movements of the hydraulic gear. The ratio of the gear train between the B end of the hydraulic gear and the cam shaft 125 is such that the cam shaft 125 makes but one revolution on either side of the load position for the entire movement of the driven object. Extending into the groove in the cam 124 there is a cam follower 127a which is secured to and extends laterally from a lever 128 adjacent one end thereof. The lever 128 is pivotally mounted, between its ends, on a pivot 129 and adjacent its opposite end the lever has a second laterally extending pin 130, as shown in Figure 14. Also mounted upon the pivot 129, there are a pair of jaws 131 and 132. These jaws have forked ends through which the valve rod 39 passes and they are normally held separated by a spring 133. On the valve rod 39 there is a ball 134 positioned between the jaws 131 and 132. When the cam follower 127 is in the section 124c of the cam groove and midway between the outer and inner circles, the lever 128 is substantially perpendicular to the plane of the plate 60 and it is in this position when the driven object, or the gun in the case of ordnance, is in the loading position. When the jaws are closed and engaging the ball 134 and the lever is in this position, the valve 19 is constrained in its neutral position and the hydraulic gear is at rest; when the jaws are closed in any other position of the cam follower in the cam groove, the valve 19 is displaced from its neutral position and the hydraulic gear is in motion.

The load control mechanism is brought into operation to actuate the valve rod 39 by moving the control lever 10 to the load position. When the valve 49 is moved to the load position the passage 49a is placed into communication with the passage 55 so that fluid under pressure is delivered to the passage 55. The passage 55 connects through pipe 59 with a passage 135 (see Fig. 12) in the block 121. The passage 135 communicates with a passage 136 at its longitudinal center. One end of the passage 136 communicates with a passage 137 which connects the passage 136 to one end of a plunger chamber 138. The other end of the passage 136 communicates with a passage 139 which connects the passage 136 to one end of a plunger chamber 140. Within the plunger chamber 138 there is a plunger 141 and a similar plunger 142 is disposed within the plunger chamber 140. The plungers 141 and 142 extend into engagement with the jaws 131 and 132 respectively. When fluid under pressure is admitted to the plunger chambers, the plungers force the jaws 131 and 132 together until the jaws engage the pin 130 on the lever 128. On the jaws being forced together, they engage the ball 134 on the valve rod 39. If the cam follower 127a is in any other position than that shown in Figure 14, the bringing of the jaws 131 and 132 together will move the ball 134 and consequently the valve rod 39 and valve 19 from the neutral position, the direction in which the valve is moved will depend upon whether the cam follower 127a is in the section 124a or 124b of the cam groove. The jaws will maintain the valve rod in a position to effect movement of the hydraulic gear until the gear moves an amount sufficient to bring the cam follower 127 into the position illustrated in Figure 14. In this position, the valve 19 will be moved to the neutral position and the hydraulic gear will be stopped.

In the block 121 there are provided two passages, 143 and 144, both of which communicate with an exhaust passage 145. The passage 143 communicates with the plunger chamber 122, at the reduced portion of the plunger, and a section of the plunger compartment 139 between the ends of the plunger therein. The passage 144 communicates with a section of the plunger compartment 140 between the ends of the plunger therein. These exhaust passages carry any leakage of oil past the plunger to the exhaust.

HAND CONTROL

As heretofore stated, the control element or tilting box 6 of the hydraulic gear may be actuated by the direct application of the physical force of an operator. When it is desired to control the hydraulic gear in this manner, the control lever 10 is moved to the hand control position. As heretofore explained, when the control lever 10 is in this position, the valve 49 is so positioned that the high pressure and exhaust sides of the pump are connected together so that the pump is incapable of delivering oil under pressure for the purpose of operating the hydraulic control. The pressure on the hydraulic fluid is therefore relieved and the hydraulically operated clutch 11 is released so that the hand-wheels 12 are connected for operating the tilting box of the hydraulic gear. The hand-wheels 12 are mounted upon a shaft 146 extending between and journaled in inclined frame elements 147 and 148, as shown in Figures 1, 2 and 15. On the shaft, intermediate the frame members, there is mounted a worm 149 for rotation with the shaft. The worm 149 engages a worm wheel 150 mounted on the end of a shaft 151 (see Fig. 15) extending longitudinally of the frame elements 147 and 148. A clutch element 11a is mounted on the shaft 151 which extends through the cylinder 11 and a complementary clutch element 11b is mounted on the end of a shaft 152. The clutch is controlled by a spring and a plunger in the cylinder 11. The spring acts to close the clutch and fluid under pressure acts on the plunger to compress the spring and open the clutch. The clutch is thus a normally closing clutch so that in case of emergency and failure of the hydraulic pressure the clutch will automatically close and leave the hydraulic gear in condition for operation by the direct application of the physical force of an operator.

When the clutch is closed, the shaft 151 is connected to the shaft 152 which is journaled in bearing brackets 153 and 154 secured to the frame members 147 and 148. On the shaft 152 there is mounted a bevel gear 155 for rotation with the shaft. The beveled gear 155 meshes with a bevel gear 156 mounted upon the end of a stub shaft 157 extending into the case of the hydraulic gear. The shaft 157 (see Fig. 3) is formed integral with a cylindrical, coupling bracket 158 mounted within a projecting section 159 of the case of the hydraulic gear. The bracket 158 is provided with an inner end piece 158a which is journaled in a ball bearing 160, and a pair of diametrically opposite slots 158b and 158c are formed in the cylindrical bracket 158 to receive a lug 161 which is slidably mounted within the cylindrical bracket for longitudinal movement with respect thereto. The lug 161 is mounted on the end of a shaft 162 for rotational movement therewith. On a portion of the shaft 162 there is formed a square helical thread 162a which is complementary to the internal threads on a bushing 163 into which the shaft 162 is threaded. The bushing 163 is mounted in axial alignment with the cylindrical bracket 158 and it is received within a hollow shaft 164 to which it is secured against relative rotational movement. The shaft 164 is journaled in a bearing bracket 165 and has formed on the end thereof a gear 166. The gear 166 meshes with a pinion 167 secured on the shaft of the B end of the hydraulic gear. The shaft 162 extends through the bushing 163 and is coupled to an extension 15b of the piston rod 15 by a coupling 168. The coupling 168 is such that the shaft 162 may be rotated within it relative to the rod 15, but it is prevented from any material longitudinal movement with respect to the rod 15 by the coupling. The part of the coupling 168 secured to the piston rod 15 is splined upon a projection 169 on the case of the hydraulic gear so that it is free for movement longitudinally with respect to the axis of the shafts 162 and 15b but restrained against relative rotational movement with respect to the casing of the hydraulic gear. It will thus be seen that longitudinal movement of the shaft 162 effects longitudinal movement of the piston rod 15 and, consequently, the tilting box 6 of the hydraulic gear.

From the motion transmission train described immediately above, it will be apparent that the cylindrical bracket 158 may be rotated by rotating the hand-wheels 12. Rotational movement of the hand-wheels 12 is translated into rotational movement of the shaft 151 by the worm and worm wheel 149 and 150 and rotational movement of the shaft 151 effects rotational movement of the cylindrical bracket, when the clutch 11 is closed. When the cylindrical bracket 158 is rotated, the shaft 162 is also rotated. The rotation of the shaft 162 is relative to the bushing 163 since the bushing is rotated or held stationary in accordance with the shaft of the B end of the hydraulic gear. Relative rotational movement between the shaft 162 and 163 will effect longitudinal movement of the shaft 162 and consequently movement of the tilting box 6 of the hydraulic gear. The direction of movement of the tilting box 6 will depeend upon the direction in which the hand-wheels 12 are moved. When the tilting box of the hydraulic gear is moved, the B end of the hydraulic gear starts rotating, and through the pinion 167 and the gear 166, the bushing 163 is rotated in the same direction as the rotation of the shaft 162 which initiated the operation of the hydraulic gear. This relative rotation of the bushing 163 will cause a reverse longitudinal movement of the shaft 162. The hydraulic gear is, therefore, operated in accordance with the difference in movement between the movement of the hand-wheels 12 and the movement of the driven object as represented by the shaft of the B end of the hydraulic gear.

LIMIT STOPS

For the purpose of preventing the driven object from moving beyond certain limited positions, there are provided limit stops which operate to prevent the hydraulic gear from driving the driven object beyond the desirable limits in either direction of its movement. The limit stops act, irrespective of whether the hand or hydraulic control is functioning, to bring the tilting box to its neutral position when the driven object approaches a limiting position. The limit stops are mounted between the frame members 147 and 148 and are operated by the shaft 152, as disclosed in Figure 15.

This shaft has a threaded section 152a. At each end of this threaded section there is secured to the shaft a block, 171 and 172. The block 171 has a lug 171a extending in one direction and the block 172 has a lug 172a extending in the opposite direction, as clearly shown in Figures 15 and 16. Threaded on the threaded portion 152a of the shaft, there is a V-shaped bracket 173 which includes a pair of arms 173a and 173b. Through the arm 173a there is an opening in the plane of the bracket which receives a rod 174 secured in the arm by a transverse pin 175 extending through the rod 174 and into openings in the arm 173a. The pin receiving openings in the arm 173a are materially larger than the pin 175 so that the rod 174 may move a limited amount relative to the arm 173a. A stiff spring 176 acts upon a head 174a formed on the rod 174 and upon the arm 173a. The head 174a of the rod 174 is adjacent an elongated block 177 secured to a plate 178 extending between the frame members 147 and 148. The block 177 has a pair of inclined faces one of which is opposite the head 174a of the rod 174 and the other of which is opposite the head 174'a of a similar rod mounted in the arm 173b in the same manner as the rod 174 is mounted in the arm 173a. Midway between the arms of the bracket, there is mounted in the bracket a block 179 which extends through the bracket and projects from either side thereof. As the shaft 152 is rotated, the bracket 173 moves longitudinally of the shaft, it being prevented from rotating with the shaft by the engagement of the head 174a or 174'a with the block 177. As the bracket 173 approaches the block 171 the lug 171a on the block 171 engages the lug 179 on the bracket and further rotation of the shaft 152 in the direction in which it was rotating when this engagement occurred, is prevented. Likewise when the shaft 152 is rotating in the opposite direction, the lug 172a on the block 172 engages the projecting end of the lug 179 on the bracket 173 when the bracket approaches close to the lug 172. Thus, further rotation of the shaft in this direction is prevented. It will thus be apparent that the shaft 152 can only be rotated in either direction a limited amount.

As previously explained, the shaft 152 is connected to the cylindrical bracket 158 by the bevel gears 155 and 156. Consequently the bracket 158 (Figure 3) can only be rotated in either direction a limited amount. If the tilting box is being operated hydraulically through any one of the several hydraulic controls, the shaft 162 will be hydraulically restrained against longitudinal movement and the pinion 167 on the shaft of the B end of the hydraulic gear will rotate the gear 166. During the hydraulic operation of the tilting box, the clutch 11 is open so that the shaft 152 is free to rotate; it is not restrained against rotation by the engagement of the worm and worm wheels 149 and 150 as is the case when the clutch is engaged. The shaft 162, the cylindrical bracket 158 and consequently the shaft 152 are, therefore, rotated in accordance with the rotation of the shaft of the B end of the hydraulic gear. This rotation of the shaft 152 through the train of gears just described will continue until the block 171 or the block 172 engages the lug on the bracket 173 when further rotation of the shaft 152 is prevented. When this occurs, the bushing 163 continues to rotate and rotates relative to the shaft 162. This relative rotation causes longitudinal movement of the shaft 162 and forcibly moves the tilting box to the neutral position against the hydraulic pressures acting on the piston 13.

In order to prevent excess pressures being created in the piston chamber 14 when the tilting box of the hydraulic gear is thus moved to the neutral position by the action of the limit stops, there is provided a relief valve 180 (see Fig. 4). The relief valve 180 is connected to the passage 29 and to the exhaust line 24. When the limit stops move the tilting box to the neutral position the pressure created by the movement of the piston 13 against the hydraulic medium within the cylinder is relieved through this relief valve.

When the tilting box of the hydraulic gear is being operated through the hand-wheels 12, the clutch 11 is engaged and the shaft 152 is rotated directly by the shaft 151. When the hand-wheels are rotated a certain definite amount, the block 171 or the block 172 depending upon the direction of rotation of the hand-wheels, will engage the bracket 173 and prevent further rotation of the shafts 152 and 162. The hydraulic gear will then effect longitudinal movement of the shaft 162 by virtue of the bushing 163 being rotated relative to the shaft 162 by the B end of the hydraulic gear and bring the tilting box 6 to its neutral position. The ratio of the gears involved in this train of gears is such that the driven object has a definite limited movement beyond which it cannot go in either direction. As previously pointed out there is no oil pressure when the hand control is in operation and consequently the relief valve has no function under hand control when the limit stops are reached.

It will be apparent that various changes may be made by those skilled in the art in the details of the embodiment illustrated in the drawings and specifically described above within the scope and principle of the invention as expressed in the appended claims.

We claim:

1. In a mechanism for driving an object in accordance with the movements of another object, the combination comprising a movable object, a driven object, variable-speed, power driven operating means for the driven object, and control means for the power-driven operating means including a movable control member, means differentially connected to the movable and driven objects and yieldably connected to the movable control member for actuating the movable control member in accordance with the difference in movement between the movable and driven objects, and additional means for actuating the movable control member to bring the driven object to a fixed, predetermined position, and means for directly connecting said additional means to said movable member to actuate the same.

2. In a mechanism for driving an object in accordance with the movement of another object, the combination comprising a movable object, a driven object, variable-speed, power-driven operating means for the driven object and control means for said power-driven operating means including a movable control element and means for moving said movable control element in accordance with the difference in movement between said movable and driven objects in a one to one ratio, another movable control element, means for moving said second mentioned control element in accordance with the difference in movement between said movable and driven objects in a ratio greater than one to one, and additional means for moving said second mentioned control element operable in accordance with the positional relation of the driven object to a fixed, predetermined position.

3. In a mechanism for driving an object in accordance with the movement of another object, the combination comprising a movable object, a driven object, variable-speed, power-driven operating means for the driven object and control means for said power-driven operating means including a movable control element and means for moving said movable control element in accordance with the difference in movement between said movable and driven objects in a one to one ratio, another movable control element, means for moving said second mentioned control element in accordance with the difference in movement between said movable and driven objects in a ratio greater than one to one, means operative in accordance with the positional relation of the driven object to a fixed, predetermined position for moving said second mentioned control element, and manually operable means for moving said second mentioned control element.

4. In a mechanism for driving an object in accordance with the movement of another object, the combination comprising a movable object, a driven object, variable-speed, power-driven operating means for the driven object and control means for said power-driven operating means including a movable control element and means for moving said movable control element in accordance with the difference in movement between said movable and driven objects in a one to one ratio, another movable control element, means for moving said second mentioned control element in accordance with the difference in movement between said movable and driven objects in a ratio greater than one to one, means for moving said second mentioned control element in accordance with the relation of the driven object to a fixed, predetermined position, manually operable means for moving said second mentioned control element, and means for selectively connecting said control element moving means for operating said second mentioned control element.

5. In a mechanism for driving an object in accordance with the movement of another object, the combination comprising a movable object, a driven object, variable-speed, power-driven operating means for the driven object and control means for said power-driven operating means including a movable control element and means for moving said movable control element in accordance with the difference in movement between said movable and driven objects in a one to one ratio, another movable control element, means for moving said second mentioned control element in accordance with the difference in movement between said movable and driven objects in a ratio greater than one to one, means for moving said second mentioned control element in accordance with the relation of the driven object to a fixed, predetermined position, manually operable means for moving said second mentioned control element, means for rendering the first mentioned control element ineffective and means for selectively connecting said control element moving means for operating said second mentioned control element.

6. In a mechanism for driving an object in accordance with the movement of another object, the combination of a driven object, a movable object, a power unit having a rotatable element operatively connected to the driven object, a member for controlling rotation of the element, manually operable means for actuating the control member including a power actuated clutch, power actuated means for actuating the control member in accordance with relative movement between the driven and movable objects, and a connection between the power actuated means and the power actuated clutch to actuate the clutch to disconnect the manually operable means from the control element when the power actuated means is effective for actuating the control element.

7. In a mechanism for driving an object in accordance with the movement of another object, the combination comprising a movable object, a driven object, a substantially constant speed prime mover for driving the driven object, a variable speed transmission connecting the prime mover and the driven object, control means for said transmission including a movable control element and means differentially connected to the movable and driven objects and yieldably connected to the movable control element for moving said control element in accordance with the difference in movement between said movable and driven objects, and additional means for moving said control element according to the departure of said driven object from a reference position.

EDWARD J. POITRAS.
JAMES D. TEAR.

REFERENCES CITED

The following references are of record in the file of this patent:

UNITED STATES PATENTS

| Number | Name | Date |
|---|---|---|
| 1,292,029 | Paine | Jan. 21, 1919 |
| 1,296,303 | Manly | Mar. 4, 1919 |
| 1,375,269 | Akemann | Apr. 19, 1921 |
| 1,387,678 | Anderson | Aug. 16, 1921 |
| 1,559,566 | Farrell et al. | Nov. 3, 1925 |
| 1,612,118 | Hewlett | Dec. 28, 1926 |
| 1,747,349 | Crain | Feb. 18, 1930 |
| 1,986,640 | Lamond | Jan. 1, 1935 |
| 2,019,264 | Koons | Oct. 29, 1935 |
| 2,023,168 | Erling | Dec. 3, 1935 |

FOREIGN PATENTS

| Number | Country | Date |
|---|---|---|
| 21,436 | Great Britain | 1912 |
| 428,533 | Great Britain | May 10, 1935 |